United States Patent
Zaslow et al.

(10) Patent No.: US 10,608,929 B2
(45) Date of Patent: Mar. 31, 2020

(54) METHOD FOR ROUTING COMMUNICATIONS FROM A MOBILE DEVICE TO A TARGET DEVICE

(71) Applicant: MOTOROLA SOLUTIONS, INC, Chicago, IL (US)

(72) Inventors: Benjamin Zaslow, Chicago, IL (US); Isabel Firpo, Chicago, IL (US); Eric Johnson, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/993,749

(22) Filed: May 31, 2018

(65) Prior Publication Data
US 2019/0372893 A1    Dec. 5, 2019

(51) Int. Cl.
| | |
|---|---|
| H04L 12/725 | (2013.01) |
| H04W 40/32 | (2009.01) |
| H04W 4/021 | (2018.01) |
| H04W 4/90 | (2018.01) |
| G10L 15/08 | (2006.01) |

(52) U.S. Cl.
CPC .......... *H04L 45/3065* (2013.01); *G10L 15/08* (2013.01); *H04W 4/021* (2013.01); *H04W 4/90* (2018.02); *H04W 40/32* (2013.01)

(58) Field of Classification Search
None
See application file for complete search history.

(56) References Cited

U.S. PATENT DOCUMENTS

| | | | |
|---|---|---|---|
| 7,065,198 B2 | 6/2006 | Brown et al. | |
| 7,082,393 B2 | 7/2006 | Lahr | |
| 7,457,404 B1 | 11/2008 | Hession et al. | |
| 9,674,357 B1 | 6/2017 | Pycko et al. | |
| 9,876,909 B1 | 1/2018 | Klein et al. | |
| 2009/0197564 A1* | 8/2009 | Dunn | H04W 4/90 455/404.1 |
| 2010/0250249 A1* | 9/2010 | Fujino | H04N 7/147 704/235 |
| 2014/0274203 A1* | 9/2014 | Ganong, III | H04W 52/0251 455/556.1 |
| 2016/0293180 A1* | 10/2016 | Ur | G10L 15/26 |
| 2017/0358301 A1 | 12/2017 | Raitio et al. | |
| 2019/0066670 A1* | 2/2019 | White | G10L 15/22 |

* cited by examiner

*Primary Examiner* — Huy D Vu
*Assistant Examiner* — Bao G Nguyen
(74) *Attorney, Agent, or Firm* — Raguraman Kumaresan

(57) ABSTRACT

A method of routing communications from a mobile device to a target device. A non-whispered speech target device routing list and a whispered speech target device routing list are stored at a memory that is accessible by the mobile device. The mobile device identifies speech characteristics associated with a speech input and further determines whether the speech input corresponds to a whispered speech based on the speech characteristics. When it is determined that the speech input corresponds to a whispered speech, the mobile device routes communications corresponding to the speech input to each target device included in the whispered speech target device routing list. When it is determined that the speech input does not correspond to a whispered speech, the mobile device either routes or refrains from routing communications corresponding to the speech input to each target device included in the non-whispered speech target device routing list.

15 Claims, 5 Drawing Sheets

METHOD FOR ROUTING COMMUNICATIONS FROM A MOBILE DEVICE TO A TARGET DEVICE

BACKGROUND OF THE INVENTION

Communication devices such as mobile phones and tablets are now in common use by users and provide users with instant access to increasingly valuable information and resources. In emergency situations, communication devices are even more helpful as they allow the users to immediately reach out to someone, such as via a 911 emergency call, to seek help or share information about the situation. However, in such emergency situations, it may not be always possible for users to communicate in the same manner (e.g., with similar loudness) as they would speak during a non-emergency situation. This is particularly true for a scenario when the user of a communication device is unable to communicate the situation with clear and audible speech to avoid attention from a perpetrator during the emergency situation.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
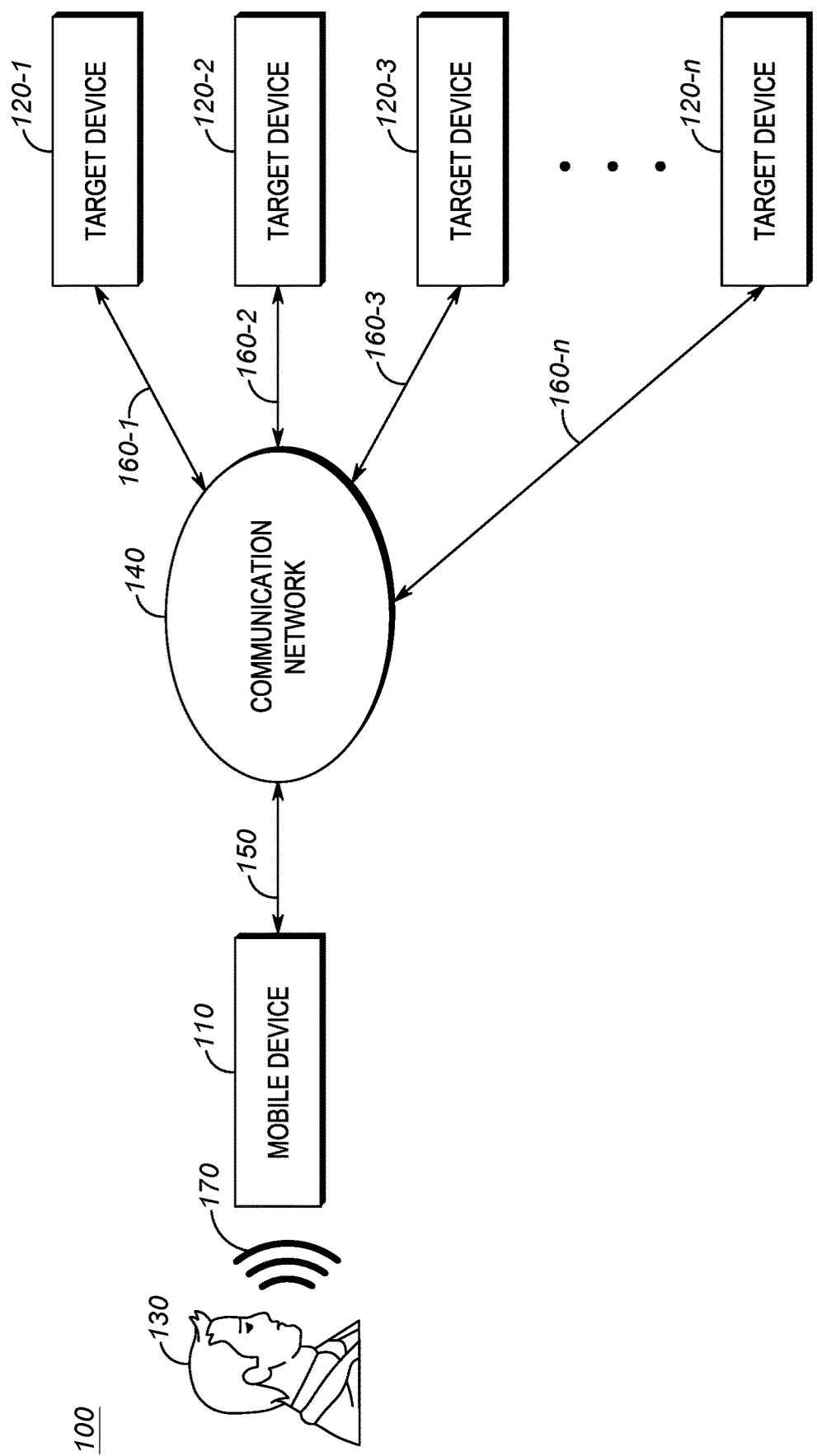
FIG. 1 is a system diagram illustrating a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As described above, in emergency situations, it may not be always possible for users to communicate in the same manner as they would speak during a non-emergency situation. In such situations, users often feel the need to whisper (for example, speak at a lower volume level) to avoid unnecessary attention, for example, from an armed shooter during the emergency situation. There are different ways to determine whether a given situation has escalated, or that there is an imminent danger at a location. One way to determine that the user (e.g., a 911 caller or an officer responding to an incident) is in danger is to identify that the user is whispering. In other words, whispered speech is an indication that the user may be in danger. Public safety personnel such as police officers also often use whispered speech to communicate over their radios to maintain their covert status. Accordingly, communication systems, in particular systems that are employed for supporting public safety communications, need to distinguish a situation in which whispered speech is detected from speech input of a user and further perform a situation escalation response procedure when whispered speech is detected.

Disclosed is a method for routing communications from a mobile device to a target device. The disclosed method performs a situation escalation response procedure in which communications corresponding to a speech input is routed to a different set of target devices when whispered speech is detected. In other words, the disclosed method uses the distinction between a whispered speech and a non-whispered speech associated with a speech input to selectively identify the target devices to which communications corresponding to the speech input need to be routed.

One embodiment provides a method of routing communications from a mobile device to a target device. The method includes storing, at a memory, a non-whispered speech target device routing list and a whispered speech target device routing list that is different from the non-whispered speech target device routing list; identifying, at an electronic processor, one or more speech characteristics associated with a speech input received at the mobile device; determining, at the electronic processor, whether the speech input corresponds to a whispered speech based on the one or more speech characteristics; when it is determined that the speech input corresponds to a whispered speech, routing, at the electronic processor, communications corresponding to the speech input to each target device included in the whispered speech target device routing list; and when it is determined that the speech input does not correspond to a whispered speech, one of: routing, at the electronic processor, communications corresponding to the speech input to each target device included in the non-whispered speech target device routing list, and refraining, at the electronic processor, from routing communications corresponding to the speech input to any target device included in the non-whispered speech target device routing list or the whispered speech target device routing list.

Another embodiment provides a mobile device that includes a memory, a wireless transceiver, and an electronic processor communicatively coupled to the memory and wireless transceiver. The memory stores a non-whispered speech target device routing list and a whispered speech target device routing list that is different from the non-whispered speech target device routing list. The electronic processor is configured to: identify one or more speech characteristics associated with a speech input received at the mobile device; determine whether the speech input corresponds to a whispered speech based on the one or more speech characteristics; when it is determined that the speech input corresponds to a whispered speech, route, via the wireless transceiver, communications corresponding to the speech input to each target device included in the whispered speech target device routing list; and when it is determined that the speech input does not correspond to a whispered speech, one of: route, via the wireless transceiver, communications corresponding to the speech input to each target device included in the non-whispered speech target device routing list, and refrain from routing communications corresponding to the speech input to any target device included in the non-whispered speech target device routing list or the whispered speech target device routing list.

Each of the above-mentioned embodiments will be discussed in more detail below, starting with example communication system and device architectures of the system in which the embodiments may be practiced, followed by an illustration of processing steps for achieving the method, device, and system described herein. Further advantages and features consistent with this disclosure will be set forth in the following detailed description, with reference to the figures.

Referring now to the drawings, and in particular FIG. 1, an example communication system 100 is shown including a mobile device 110 and a plurality of target devices 120-1 through 120-n. The mobile device 110 may be operated by a user 130 (for example, a public safety personnel), who may carry or wear the mobile device 110. The mobile device 110 includes, but not limited to a battery-powered portable radio used for narrowband and/or broadband direct-mode or infrastructure communications, a battery-powered radio speaker microphone (RSM) video capture device, a laptop having an integrated video camera and used for data applications such as incident support applications, smart glasses which may be virtual reality, augmented reality, or mixed reality glasses, wearable communication devices, mobile phones, and vehicular radios. The mobile device 110 includes one or more wireless communication interfaces for communicating with other devices or networks in the communication system 100. The mobile device 110 is configured to communicate with one or more of the plurality of target devices 120-1 through 120-n via a communication network 140. Wireless air-interface link 150 communicatively couples the mobile device 110 to the communication network 140 and other network devices (not shown). Although, only one mobile device 110 is shown in FIG. 1 for illustrative purposes, any number of mobile devices 110 may be implemented in the communication system 100.

The plurality of target devices 120-1 through 120-n can be interchangeably referred to, collectively, as target devices 120, and generically as a target device 120. The target device 120 is implemented as a communication device or server that is configured to receive communications from the mobile device 110 via the communication network 140. For example, in public safety communication systems, the target device 120 may be implemented as a client device or a server. For example, the target device 120 may be a mobile device operated by another public safety personnel, a dispatch console that is operated by a dispatcher, or a public safety answering point (PSAP) terminal that is operated to receive emergency calls such as 911 calls. Wired or wireless air-interface links 160-1 through 160-n communicatively couple the respective target devices 120-1 through 120-n to the mobile device 110 and other network devices (not shown), via the communication network 140. The communication network 140 may include a wired or wireless network, or a combination of wired and wireless networks, operated for example, by a cellular service provider, or any public safety network operated by a government or private organization. In one embodiment, the communication networks 140 may include one or more of land mobile radio (LMR) networks, such as implemented in accordance with Association of Public Safety Communication officials (APCO) Project 25 (P25) networks and long-term evolution (LTE) networks. The communication networks 140, for example, may include network components such as base stations (not shown) that can receive information (data, voice, video, etc.) in a signal from the mobile device 110 and the target devices 120. The base stations can also transmit information in signals to the mobile device 110 and target devices 120. In accordance with some embodiments, the mobile device 110 may use direct mode of operation to communicate with the target devices 120. For example, the mobile device 110 is wirelessly coupled to a target device 120 via a direct-mode air interface link (not shown) in accordance with one or more direct-mode air-interface protocols, such as Bluetooth, near field communication (NFC), Infrared Data Association (IrDA), ZigBee, direct-mode land mobile radio (LMR), and/or Wi-Fi, as long as the devices 110, 120 are within mutual transmission of one other.

In accordance with some embodiments, the mobile device 110 is configured to receive speech input 170 from the user 130 and route communications (e.g., content of speech input 170) corresponding to the speech input 170 to target devices 120 that are selected based on whether the speech input 170 corresponds to a whispered speech or a non-whispered speech.

Figure 2:
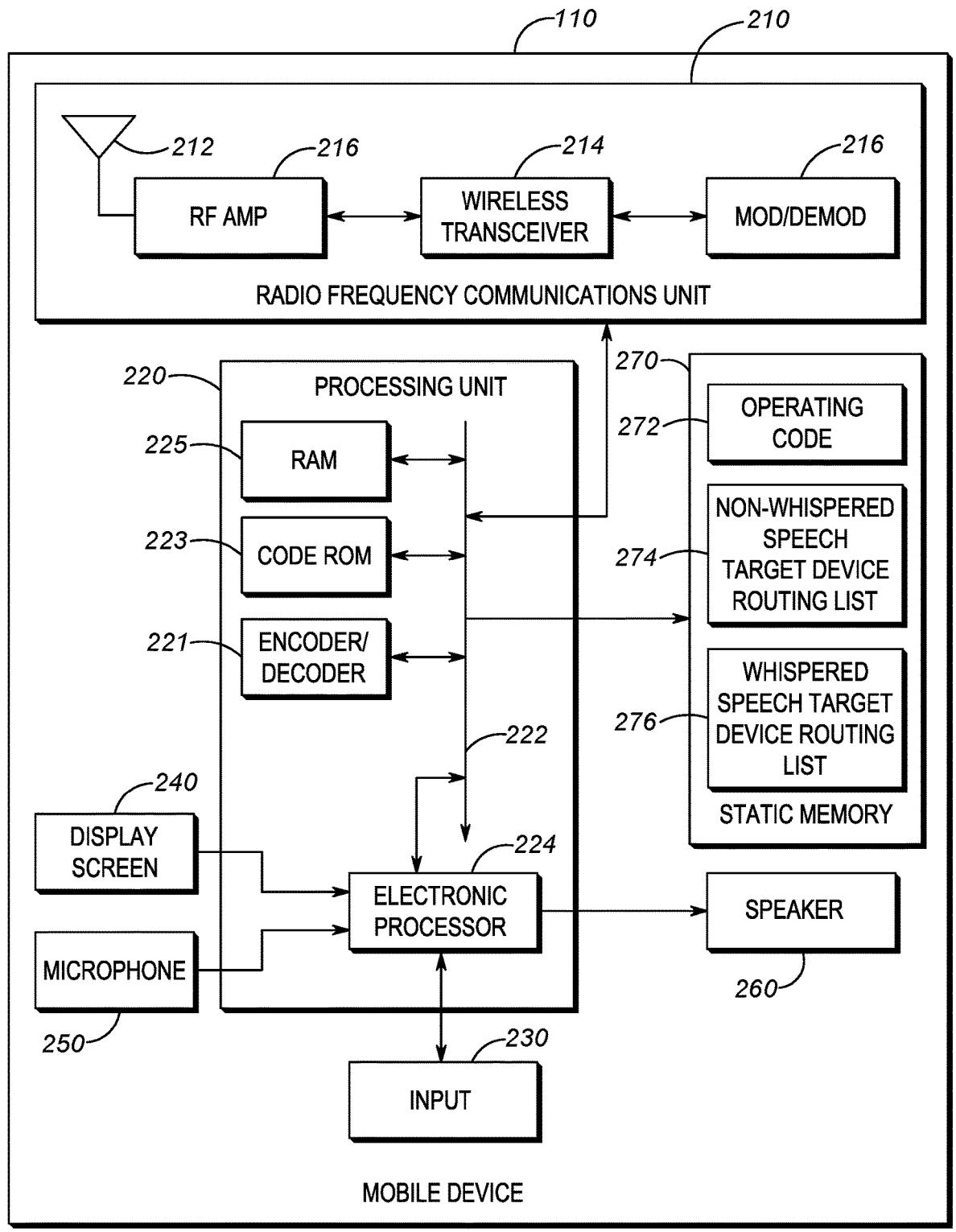
FIG. 2 is a device diagram showing a device structure of a mobile device of the system of FIG. 1 in accordance with some embodiments.

FIG. 2 is an example functional block diagram of a mobile device 110 operating within the communication system 100 in accordance with some embodiments. While FIG. 2 represents a mobile device 110 described above with respect to FIG. 1, depending on the type of mobile device 110, the mobile device 110 may include fewer or additional components in configurations different from that illustrated in FIG. 2.

As shown in FIG. 2, the mobile device 110 includes a radio frequency communications unit 210 coupled to a common data and address bus 222 of a processing unit 220. The mobile device 110 may also include an input 230 and a display screen 240, each coupled to be in communication with processing unit 220. The input 230 may include an alphanumeric physical keypad (or virtual keypad in cooperation with capacitive touch display screen 240) for inputting text for communications. In some embodiments, the input 230 may include a push-to-talk (PTT) key that functions to activate a transmit function in a half or full-duplex communication device, transitioning the mobile device 110 (when activated) from a listen-only mode to a transmit-only mode (for half-duplex communication devices) or transmit and receive mode (for full-duplex communication devices). The display screen 240 may further function to display communications received via communications unit 210. A microphone 250 captures speech input 170 from a user 130 that is further vocoded by processing unit 220 and transmitted as voice, text, or multimedia data by communications unit 210 to other communication devices such as target devices 120 in system 100. A communications speaker 260 reproduces audio that is decoded from voice data transmissions received from other communication devices (e.g., target devices 120) via the communications unit 210.

The processing unit 220 may also include an encoder/decoder 221 with an associated code Read Only Memory (ROM) 223 for storing data for initializing system components and encoding and/or decoding voice or other traffic information (including image data, audio data, video data, text data, control signals, etc.) that may be transmitted or received by the mobile device 110. The processing unit 220 may further include an electronic processor 224 coupled, by the common data and address bus 222, to the encoder/decoder 221, a random access memory (RAM) 225, and a static memory 270.

The radio frequency communications unit 210 is a combined receiver and transmitter (e.g., transceiver) having a common antenna 212. The radio frequency communications unit 210 has a transceiver 214 coupled to the antenna 212 via a radio frequency amplifier 216. The transceiver 214 may be a transceiver operating in accordance with one or more standard protocols, such as a digital mobile radio (DMR) transceiver, a Project 25 (P25) transceiver, a terrestrial trunked radio (TETRA) transceiver, a Bluetooth transceiver, a long term evolution (LTE) transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 214 is also coupled to a combined modulator/demodulator (MOD/DEMOD) 216 that is coupled to the encoder/decoder 221.

The electronic processor 224 has ports for coupling to the input 230 and to the display screen 240. The electronic processor 224 further has ports for coupling to the microphone 250 and to the speaker 260. The electronic processor 224 may include a microprocessor, a logic circuit, an application-specific integrated circuit (ASIC), a field-programmable gate array (FPGA), or another suitable electronic device. In some embodiments, the static memory 270 may store operating code 272 for the electronic processor 224 that, when executed by the electronic processor 224, perform one or more of the operations set forth in FIGS. 3-5 and accompanying text. Static memory 270 may comprise, for example, a hard disk drive (HDD), an optical disk drives (ODD) such as a compact disk (CD) drive or digital versatile disc (DVD) drive, a solid-state drive (SSD), a tape drive, a flash memory drive, or a tape drive, to name a few.

In some embodiments, the static memory 270 stores talk group data (not shown) that includes group subscription information associated with the mobile device 110. The group subscription information includes a group identifier that may identify a talk group to which the mobile device 110 is registered. The mobile device 110 may additionally track or have access to group subscription information that, for each group identifier associated with a particular group of devices (e.g., talk group), identifies communication devices (e.g., by a device identifier (ID) such as a hardware ID, hardware Media Access Control (MAC) address, Internet Protocol (IP) address, radio ID, International Mobile Subscriber Identity (IMSI), a serial number, or some other unique identifier that can be used to identify subscribed member communication devices) that are members of the particular group of communication devices. In some embodiments, one or more of the target devices 120 may be associated with a talk group in which the mobile device 110 is also a member. The term "talk group" and "communication group" are interchangeably used in the description, and that the media data being exchanged among the members of the group (e.g., mobile device 110 and target devices 120) could be any suitable type of data, such as voice data, image data, video data, and the like.

The static memory 270 further stores a non-whispered speech target device routing list 274 and whispered speech target device routing list 276. In accordance with some embodiments, the whispered speech target device routing list 276 and non-whispered speech target device routing list 274 are generated and/or stored in another device, server, or in a cloud computing cluster that is accessible by the mobile device 110.

The non-whispered speech target device routing list 274 identifies one or more of the target devices 120 shown in FIG. 1. The static memory 270 also stores a whispered speech target device routing list 276 that identifies one or more of the target devices 120. Each target device 120 in the respective lists 274, 276 is identified by any unique identifier (e.g., device ID or user ID or contact number) associated with the target device 120. In accordance with embodiments, the non-whispered speech target device routing list 274 and whispered speech target device routing list 276, each include a different set of target devices. In other words, the whispered speech target device routing list 276 may include at least one target device which is not included in the non-whispered speech target device routing list 274 or alternatively, the whispered speech target device routing list 276 may not include at least one target device which is included in the non-whispered speech target device routing list 274. For example, the non-whispered speech target device routing list 274 includes target devices 120-1 and 120-2 and the whispered speech target device routing list 276 includes a different set of devices, for example target devices 120-3 and 120-n. In other embodiments, the whispered speech target device routing list 276 may include each of the one or more target devices 120 included in the non-whispered speech target device routing list 274 in addition to the one or more target devices 120 that are not included in the non-whispered speech target device routing list 274. For example, the non-whispered speech target device routing list 274 includes target devices 120-1 and 120-2 and the whispered speech target device routing list 276 includes target devices 120-1 and 120-2 as well as target devices 120-3 and 120-n.

In one embodiment, the non-whispered speech target device routing list 274 and whispered speech target device routing list 276 are generated (or updated) and stored at the memory 270 prior to receiving and processing a speech input 170 at the mobile device 110. In this embodiment, the non-whispered speech target device routing list 274 may include target devices 120 selected from one or more communication groups in which the user 130 of the mobile device 110 is also a member. In some cases, the non-whispered speech target device routing list 274 is updated to include only target devices 120 that are members of a given communication group with which the mobile device 110 is currently communicating. For example, the mobile device 110 may be currently communicating with 'first responders' group that includes all first responders assigned to a particular incident. In this case, the non-whispered speech target device routing list 274 is generated/updated to include only target devices 120 that are members of the 'first responders' group. Similarly, the whispered speech target device routing list 276 may include target devices 120 selected from one or more pre-determined communication groups in which the user 130 of the mobile device 110 is also a member. For example, the mobile device 110 may be currently communicating with 'first responders' group, however the mobile device 110 may also be part of a pre-determined group named 'escalated incident group' which may include target devices that are not part of the 'first responders' group. In this case, the target devices 120 included in 'escalated incident' group may be associated with users, for example, supervisors or commanders of the first responder, who are at a higher position (relative to the user 130 of the mobile device 110) within the chain of command of the user 130. Accordingly, the whispered speech target device routing list 276 may include only target devices 120 selected from the 'escalated incident' group. As a further example, the whispered speech target device routing list 276 may include a target device 120 that is registered to receive an emergency call (i.e., a contact number from user's emergency contact list or alternatively a public number such as '911' emergency contact number), while the non-whispered speech target device routing list 274 may correspond to one or more target devices 120 with which the user 130 is currently communicating via a private or group call.

In other embodiments, the whispered speech target device routing list 276 is dynamically generated and stored at the memory 270 in response to receiving a speech input 170 at the mobile device 110. For example, the target devices 120 to be included in the whispered speech target device routing list 276 are dynamically selected based on one or more contextual parameters associated with the speech input 170 received at the mobile device 110. The contextual parameters include, but not limited to, a location of the mobile device 110, user profile (role, experience, skill level, performance etc.) associated with a user 130 of the mobile device 110, type of an incident assigned to the user 130 including whether the incident assignment is of covert type, biometric data (such as heart rate data, stress level etc.), talk group data, accessory coupled to the mobile device 110, proximity to other users or devices and their corresponding profile (whether civilian, suspect, or an officer), content (e.g., type of emergency) of the speech input 170, call status/mode, device configuration of the mobile device 110, environmental noise level, and other possible contextual parameters associated with escalation of an incident. In these embodiments, the mobile device 110 selects target devices 120 based on the contextual parameters associated with the speech input 170.

In accordance with embodiments, the whispered speech target device routing list 276 and non-whispered speech target device routing list 274 respectively identifies the target devices 120 to which communications corresponding to a speech input 170 is to be routed based on whether the speech input 170 corresponds to a whispered speech or not. An embodiment of a method of routing communications from the mobile device 110 to a target device 120 that is selected based on whether the speech input 170 corresponds to a whispered speech or a non-whispered speech is further described in FIG. 3 below.

Figure 3:
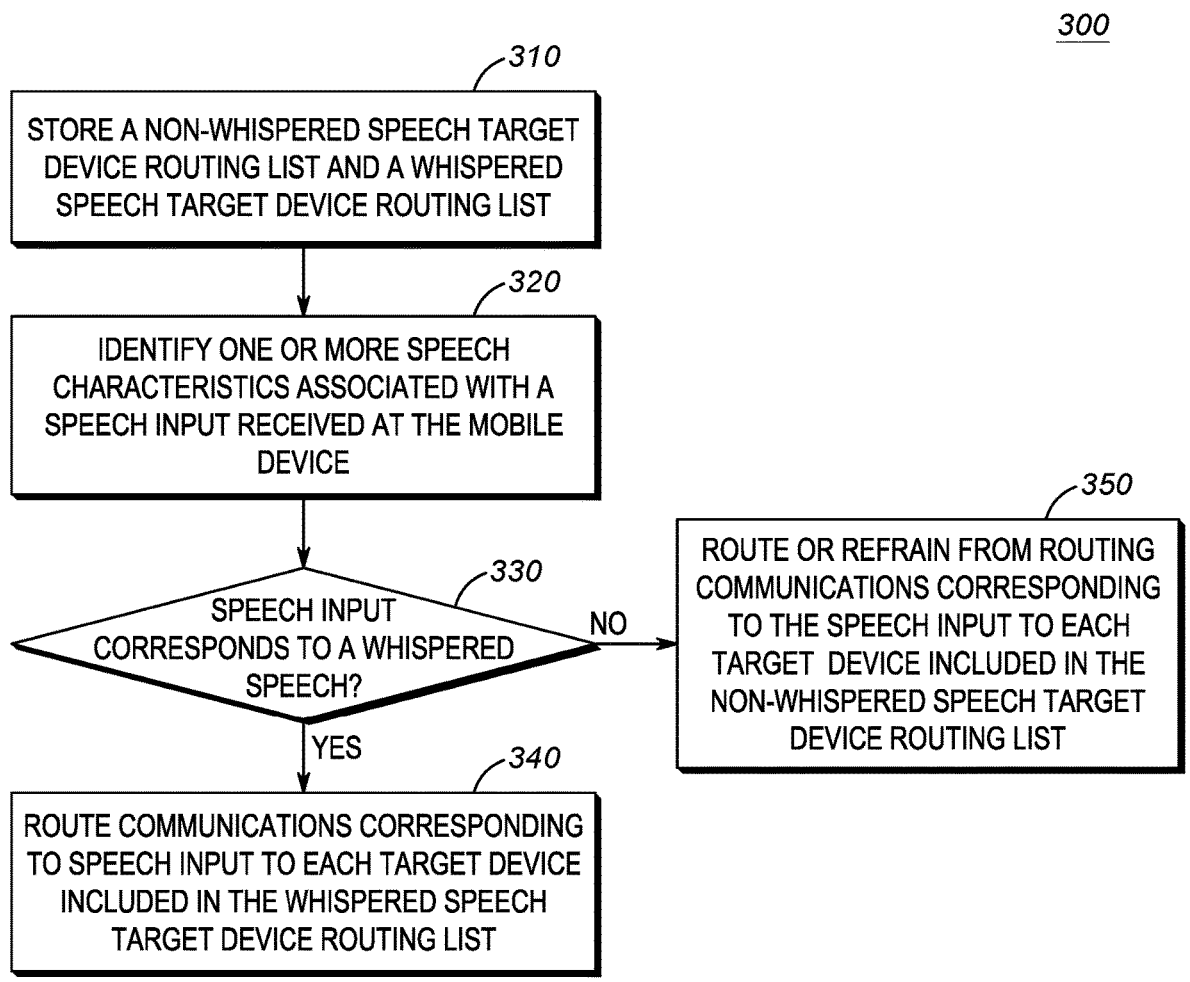
FIG. 3 illustrates a flow chart of a method of routing communications from a mobile device to a target device in accordance with some embodiments.

FIG. 3 illustrates a flow chart diagram of a method 300 for routing communications from a mobile device to a target device. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. The method shown in FIG. 3 can be performed by one or more components, for example, electronic processor 224 of the mobile device 110, and will be described with reference to the functions and components of the system 100.

At block 310, the mobile device 110 stores, at a memory 270, a non-whispered speech target device routing list 274 and whispered speech target device routing list 276. As described above with reference to FIG. 2, the non-whispered speech target device routing list 274 and whispered speech target device routing list 276 may be respectively generated and stored at the memory 270 prior to the mobile device 110 receiving a speech input 170 from the user 130. In these embodiments, the non-whispered speech target device routing list 274 and whispered speech target device routing list 276 further include respectively identified target devices 120 that are associated with one or more communication groups in which the mobile device 110 is already registered. Further, in these embodiments, the non-whispered speech target device routing list 274 may be updated to include only target devices 120 of a current talk group with which the mobile device 110 is communicating. The whispered speech target device routing list 276 may be dynamically updated in response to the speech input 170 based on contextual parameters associated with the speech input 170. For example, the mobile device 110 defines a geofence (i.e., geographical boundary) based on the current location of the mobile device 110 or a location associated with the incident, and further selects only those target devices 120 (to be included in the whispered speech target device routing list 276) that are currently located within the defined geofence. As another example, the mobile device 110 in response to receiving the speech input 170 corresponding to a whispered speech, selects one or more target devices 120 based on the role and relationship associated with the mobile device 110 and the one or more target devices 120. In this example, the mobile device 110 may only select target devices 120 of users who are at a higher level (e.g., supervisor or commander) within the chain of command of the user 130 of the mobile device 110.

At block 320, the mobile device 110 identifies, at the electronic processor 224, one or more speech characteristics associated with a speech input 170 received via a microphone 250 at the mobile device 110. In accordance with embodiments, the electronic processor 224, upon receiving the speech input 170 via the microphone 250, processes the speech input 170 to extract speech characteristics associated with the speech input 170. The speech characteristics include acoustic characteristics associated with the speech input 170 such as volume level, energy level, frequency level, amplitude level, and the like. In other embodiments, the speech characteristics include linguistic characteristics associated with the speech input 170 such as intonation level, tone level, stress level, pause duration, rhythm, and the like. In accordance with embodiments, the speech characteristics are used to determine whether a given speech input corresponds to a whispered speech or not. Other variations of speech characteristics that can be used to determine whispered speech exist as well.

At block 330, the mobile device 110 determines, at the electronic processor 224, whether the speech input 170 corresponds to a whispered speech based on the one or more speech characteristics identified at block 320. In accordance with some embodiments, the mobile device 110 determines whether the one or more speech characteristics or a combination thereof are within a predetermined range of a whispered speech level. As used herein, the term "whispered speech level" may correspond to a predetermined range of speech characteristics such as volume level, energy level, frequency level, amplitude level, or a combination thereof at which the whispered speech can be differentiated from the non-whispered speech (e.g., loud speech). The mobile device 110 determines that the speech input 170 corresponds to a whispered speech when the one or more speech characteristics are within the predetermined range of the whispered speech level. Otherwise, the mobile device 110 determines that the speech input 170 corresponds to a non-whispered speech when the one or more speech characteristics are outside (either at a lower range or at a higher range relative to the predetermined range) of the predetermined range of whispered speech level.

In some other embodiments, the speech characteristic associated with the speech input 170 may also include an indicator corresponding to one or more gestures made by the user 130 while providing speech input 170 at the mobile device 110. The mobile device 110 determines whether the speech input corresponds to a whispered speech based on the gesture indicator. For example, the mobile device 110 may acquire images of the user 130 (via a camera (not shown)) while the user 130 provides speech input 170. Further, based on the images, the mobile device 110 identifies a gesture, for example, a position of user's hand relative to the user's mouth. Based on the position of user's hand relative to the user's mouth, the mobile device 110 may determine a probability that the user 130 is trying to cover the mouth with his/her hands while providing his/her speech input 170. The mobile device 110 may further determine based on the probability (or in combination with other speech characteristics) of the gesture whether the speech input 170 corresponds to a whispered speech or not. For example, a higher probability (relative to a predetermined probability threshold) associated with the gesture may indicate that the speech input 170 corresponds to a whispered speech, and a lower probability (relative to the predetermined threshold) may indicate that the speech input 170 corresponds to a non-whispered speech. In other embodiments, the mobile device 110 may further use the gesture probability in combination with one or more of acoustic/linguistic characteristics associated with the speech input 170 to determine whether the speech input 170 corresponds to a whispered speech or not.

At block 340, when it is determined that the speech input 170 corresponds to a whispered speech, the mobile device 110 routes, at the electronic processor 224, via the wireless transceiver 214, communications corresponding to the speech input 170 to each target device 120 included in the whispered speech target device routing list 276. In accordance with some embodiments, the communications routed to the target device 120 includes, but not limited to, one of audio data, text data, or combination of audio, text, or video data that are representative of the speech input 170 received at the mobile device 110. For example, the mobile device 110 processes the speech input 170 and generates audio data from the received speech input 170 for transmission to each target device 120 identified in the whispered speech target device routing list 276. As another example, the mobile device 110 processes the speech input 170 using speech-to-text converter, and generates text data from the speech input 170 for transmission to each target device 120 identified in the whispered speech target device routing list 276. In other embodiments, the mobile device 110 may also further combine the audio or text data with additional data (such as location data, and image data acquired via the camera, for example, of the user 130 or of the user environment), to generate multimedia data for transmission to each target device 120 identified in the whispered speech target device routing list 276.

In further embodiments, the mobile device 110 also modifies the speech input 170 that corresponds to whispered speech to generate a modified speech input that corresponds to a non-whispered speech, prior to routing communications corresponding to the modified speech input to each target device 120 included in the whispered speech target device routing list 276. In these embodiments, the mobile device 110 modifies the speech input 170 by adjusting the one or more speech characteristics associated with the speech input 170 such that the one or more adjusted speech characteristics are outside of the predetermined range of the whispered speech level. Modifying the whispered speech to non-whispered speech prior to transmission ensures that the target devices 120 receive audio communications that are intelligible even though the original speech input may not be clear or audible due to the characteristics of whispered speech. In further embodiments, instead of modifying the speech input 170 corresponding to the whispered speech, the mobile device 110 signals the target devices 120 receiving the communications to increase a volume level or adjust other acoustic characteristics to ensure that the audio output is clear and audible to users at the target devices 120. In further embodiments, the mobile device 110 also sends a further signal to the target devices 120 receiving audio communications of the speech input 170 to connect a machine (speech-to-text converter) or human transcriber, or combination thereof to a call to ensure that the content of the whispered speech is transcribed with high accuracy.

In accordance with some embodiments, the speech input 170 may be received at the mobile device 110 when the user 130 is in already in conversation with one or more other users via a private or group call. The mobile device 110 determines that a call mode is activated when the speech input 170 is received during conversation with one or more other users via a private or group call. When the call mode is already activated, the mobile device 110 checks if each target device 120 included in the whispered speech target device routing list 276 is associated with the user's private or group call. Otherwise, if there are target devices from the whispered speech target device routing list 276 that are not included in the private or group call, the mobile device 110 routes the speech input 170 to target devices 120 from the whispered speech target device routing list 276 that are not included in the private or group call. Routing of communications corresponding to the speech input 170 to such target devices may be achieved either via the same call, for example, by adding the missing target devices to the existing call or alternatively routing the communications individually (via a separate private or group call) to each of the missing target devices. When the call mode is not activated, i.e., when the speech input 170 was captured at the microphone 250 during ambient listening mode (e.g., when a virtual assistant at the mobile device 110 is activated to listen to user's voice command or query) at the mobile device 110, the mobile device 110 activates the call mode to establish a group call (or private call) with the target devices 120 included in the whispered speech target device routing list 276 to route the communications corresponding to the speech input 170.

In some embodiments, after routing the communications corresponding to the speech input 170 to each target device 120 included in the whispered speech target device routing list 276 as shown in block 340, the mobile device 110 continues to monitor subsequent speech inputs received via the microphone 250 and repeats the features described in blocks 320, 330 and 340 or 350 for the purposes of routing (or refraining from routing) communications corresponding to subsequently received speech inputs based on whether the respective speech inputs correspond to whispered speech or non-whispered speech. In other embodiments, when the subsequent speech input corresponds to non-whispered speech and when one or more contextual parameters associated with the subsequent speech input indicate that the user situation remains escalated, the mobile device 110 may continue to route communications corresponding to subsequent speech input to each target device included in the whispered speech target device routing list 276.

Returning to block 330, when it is determined that the speech input 170 does not correspond to the whispered speech, the mobile device 110 proceeds to block 350 to perform one of: routing, at the electronic processor 224, via the wireless transceiver 214, communications corresponding to the speech input 170 to each target device 120 included in the non-whispered speech target device routing list 274; and refraining, at the electronic processor 224, from routing communications corresponding to the speech input 170 to any target device included in the non-whispered speech target device routing list 274 or whispered speech target device routing list 276. As an example, the speech input 170 may be received at the mobile device 110 as part of user's conversation with one or more other users via a private or group call (i.e., when call mode is activated). In accordance with embodiments, the non-whispered speech target device routing list 274 is updated to include only those target devices 120 with which the user 130 is currently communicating. Accordingly, when the speech input 170 is received at the mobile device 110 during the call mode, the mobile device 110 routes communications to each target device 120 (i.e. a target device 120 associated with other users in the private or group call) included in the non-whispered speech target device routing list 274. When the call mode is not activated, i.e., the speech input 170 was captured at the microphone 250 during ambient listening mode (e.g., when a virtual assistant at the mobile device 110 is activated to listen to user's voice command or query in response to receiving a user input, for example, via a dedicated button or via detection of a wake-up keyword) at the mobile device 110, the mobile device 110 refrains from routing communications corresponding to the speech input 170 to any target device included in the non-whispered speech target device routing list 274 or whispered speech target device routing list 276. In this example, the mobile device 110 does not route communications to other user devices because the user's speech input 170 corresponds to a voice command and may not be intended for transmission to another user device. In contrast, in this example, the mobile device 110 provides a local notification or an audio response generated by the virtual assistant (for example, to be output at speaker 260) in response to user's voice command or query.

After routing or refraining from routing the communications corresponding to the speech input 170 to each target device 120 included in the whispered speech target device routing list as shown in block 350, the mobile device 110 continues to monitor subsequent speech inputs received via the microphone 250 and repeats the features described in blocks 320, 330 and 340 or 350 for the purposes of routing (or refraining from routing) communications corresponding to subsequently received speech inputs based on whether the respective speech inputs correspond to whispered speech or non-whispered speech.

Figure 4:
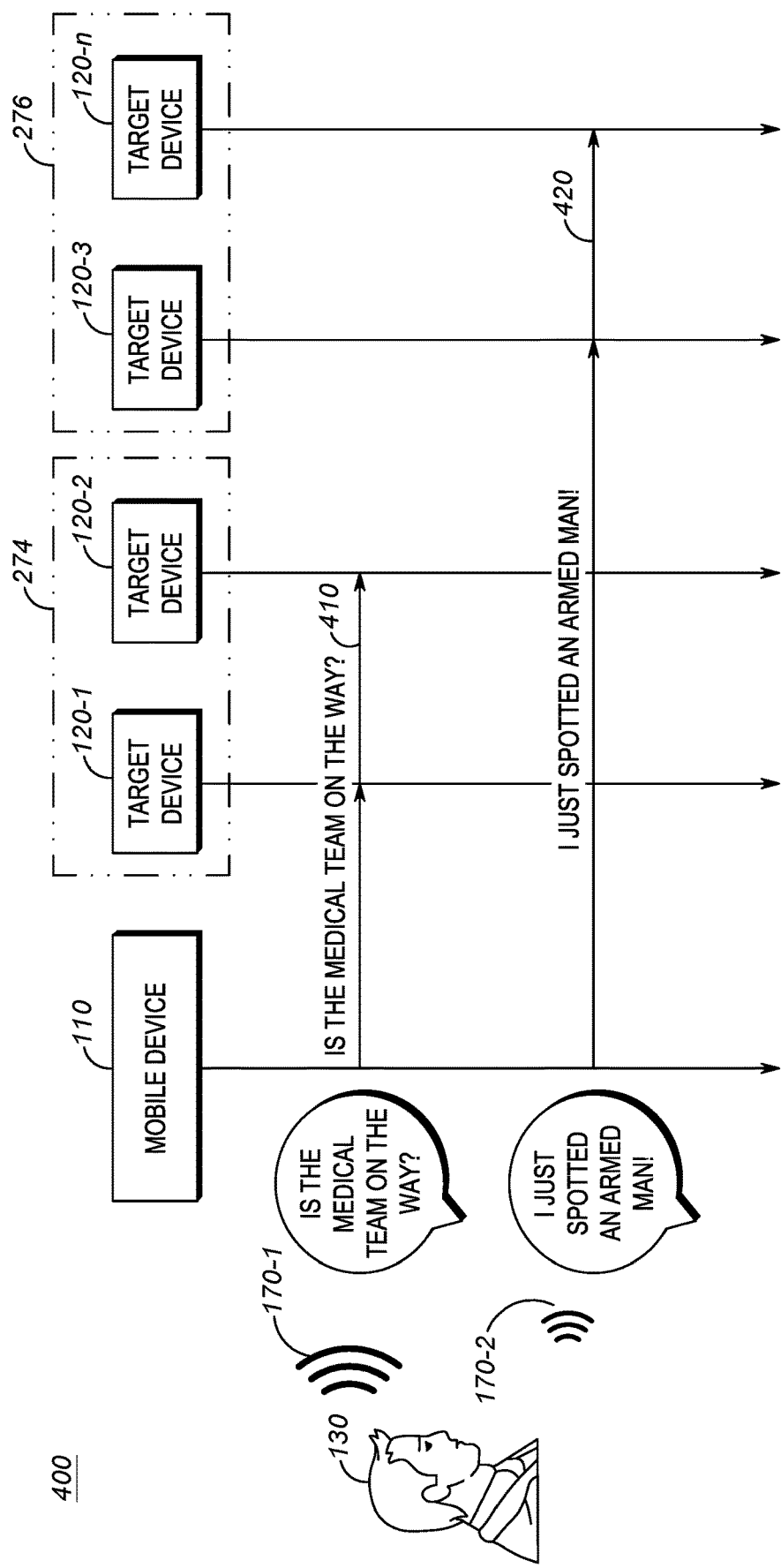
FIG. 4 illustrates a first example scenario in which the method of routing communications from a mobile device to a target device is implemented in accordance with some embodiments.

FIG. 4 illustrates a first example scenario 400 in which the method 300 of routing communications from a mobile device 110 to a target device 120 is implemented in accordance with some embodiments. As shown in FIG. 4, target devices 120-1 and 120-2 are included in the non-whispered speech target device routing list 274, and target devices 120-3 and 120-n are included in the whispered speech target device routing list 276. Also shown in FIG. 4 are a first speech input 170-1 and a second speech input 170-2 from the user 130 of the mobile device 110.

In the first example scenario 400, it is assumed that the call mode is activated at the mobile device 110 when speech inputs 170-1 and 170-2 are received from the user 130 of the mobile device 110. In other words, the mobile device 110 detects that speech inputs 170-1 and 170-2 as received as part of user's conversation with other users (i.e. of devices 120-1 and 120-2) via a talk group call. Accordingly, the non-whispered speech target device routing list 274 is updated to include only target device 120-1 and 120-2 that are associated with a talk group in which the user is currently communicating. As an example, assume that the user 130 is a first responder who is responding to a situation at an incident scene and further the user 130 (via the mobile device 110) is in conversation with members of a talk group named 'medics'. In this case, the user 130 of the mobile device 110, via speech input 170-1, queries the members of the 'medics' talk group to check if the medical team is on the way to treat the injured people at the scene. In accordance with embodiments, the mobile device 110 determines that the speech input 170-1 corresponds to a non-whispered speech (e.g., a loud speech) and therefore accordingly routes communications (i.e., "Is the medical team on the way?") 410 corresponding to the non-whispered speech to members of the current talk group or in other words, target devices 120-1 and 120-2 included in the non-whispered speech target device routing list 274.

In the first example scenario 400, it is further assumed that after the mobile device 110 routes the communications 410, the user 130 of the mobile device 110 spots an armed man in the incident scene and therefore whispers a speech input "I just spotted an armed man" 170-2 to avoid attention from the armed man. When the user 130 whispers the speech input 170-2, the mobile device 110 identifies that there is a transition in the speech, i.e., from non-whispered speech to whispered speech. The mobile device 110 may detect this transition based on the changing acoustic/linguistic characteristics that indicate that the characteristics are within the range of a whispered speech level. In some embodiments, the mobile device 110 may detect this transition based on additional sensor inputs (e.g., image data indicating that the user 130 is attempting to cover his/her mouth using the hand) which may indicate that the user 130 is whispering his speech. In any case, as soon as the transition is detected, the mobile device 110 identifies that the situation at the incident scene has escalated and therefore modifies the routing procedure. The mobile device 110 may also dynamically update the whispered speech target device routing list 276 based on contextual parameters (such as location of the mobile device 110) associated with the speech input 170-2. For example, the mobile device 110 updates the whispered speech target device routing list 276 to include target devices (e.g., target devices 120-2 and 120-n) of users who may be located within a predefined distance from the location of the mobile device 110 or the location associated with the incident. Accordingly, the mobile device 110, instead of continuing to route communications to the 'medics' talk group (i.e., target devices 120-1 and 120-2 in the non-whispered speech target device routing list 274), modifies the routing procedure in order to route communications 420 corresponding to the speech input "I just spotted an armed man" 170-2 to target devices 120-3 and 120-n included in the whispered speech target device routing list 276.

In accordance with some embodiments, in the first example scenario 400, it is possible that there may be more than one user (including civilians) who may have spotted the armed man and further more than one user may be whispering their speech during conversations with others via a private/group call, or in-person. Similarly, it is possible that there are other users at the location of the incident scene, but may not have spotted the armed man. In this case, a central device (the mobile device 110 or a central controller such as command center (not shown)) that coordinates the communications between the first responders at the incident scene) may be configured to receive information (e.g. identity and location) about users who are whispering at the incident scene. The central device may use this information to determine that the users who are whispering speech inputs during conversations with others are relatively closer to a person of interest (i.e., the armed man) as against other users who may be located at the incident scene. The central device may further indicate the location of the person of interest (e.g., by providing a notification or visual map identifying the location of whispering users) to warn other users (nearby civilians or other first responders) about the increased danger at the scene.

Figure 5:
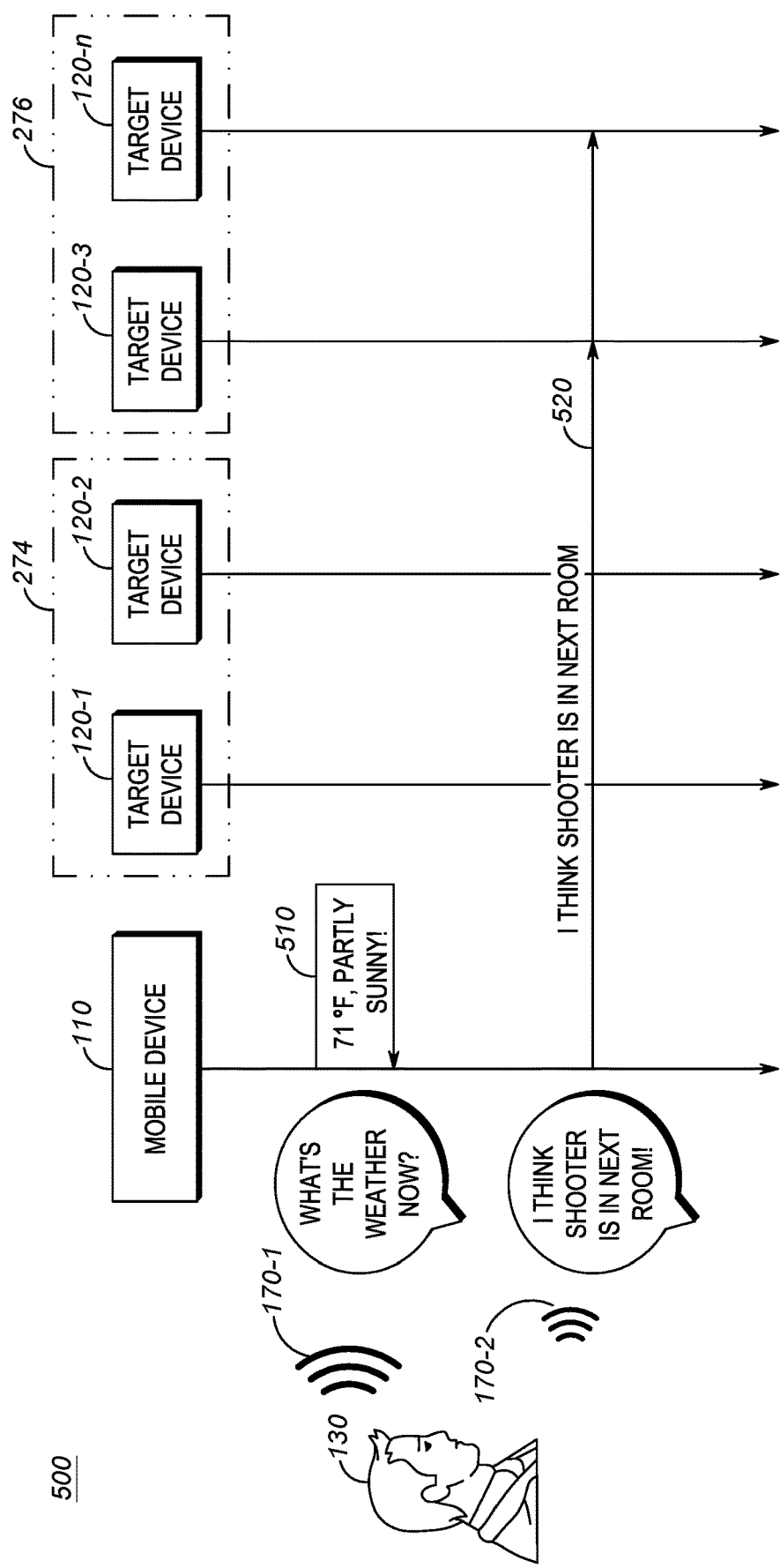
FIG. 5 illustrates a second example scenario in which the method of routing communications from a mobile device to a target device is implemented in accordance with some embodiments.

FIG. 5 illustrates a second example scenario 500 in which the method 300 of routing communications from a mobile device 110 to a target device 120 is implemented in accordance with some embodiments. As shown in FIG. 5, target devices 120-1 and 120-2 are included in the non-whispered speech target device routing list 274, and target devices 120-3 and 120-n are included in the whispered speech target device routing list 276. Also shown in FIG. 5 are a first speech input 170-1 and a second speech input 170-2 from the user 130 of the mobile device 110.

In the second example scenario 500, it is assumed that the call mode is not activated at the mobile device 110 when speech inputs 170-1 and 170-2 are received from the user 130 of the mobile device 110. In other words, the mobile device 110 receives speech inputs 170-1 and 170-2 when ambient listening mode is activated at the mobile device 110. The ambient listening mode may be manually activated at the mobile device 110 by the user 130 or alternatively remotely activated by a network component in the system 100. In accordance with some embodiments, a virtual assistant is implemented at the mobile device 110 and is configured to activate the ambient listening mode. The virtual assistant may be a software application running on underlying electronic hardware that are capable of understanding natural language (i.e., unstructured data inputs), and may complete electronic tasks in response to user's speech inputs. For example, the virtual assistant receives a speech input "What's the weather now?" 170-1 and processes the speech input 170-1 using natural language understanding algorithms to identify the intent and/or content of the speech input 170-1. Accordingly, the virtual assistant, based on the identified intent and/or content of the speech input 170-1, generates a response 510 (for example, via an audio output at the speaker 260 of the mobile device 110) with the weather information "71° F., Partly Sunny!". Further, in this case, the mobile device 110 determines that the speech input 170-1 corresponds to a non-whispered speech (e.g., a loud speech) and accordingly refrains from routing communications corresponding to the speech input 170-1 to another device, i.e., to any target device included in the non-whispered speech target device routing list 274 or whispered speech target device routing list 276.

In the second example scenario 500, it is further assumed that after the virtual assistant generates a response 510 for the user 130 of the mobile device 110, the user 130 of the mobile device 110 hears shots fired and thereafter whispers a speech input "I think shooter is in next room" 170-2 to avoid attention from the shooter who may be located in the next room. When the user 130 whispers the speech input 170-2, the mobile device 110 identifies that there is a transition in the speech, i.e. from non-whispered speech to whispered speech. The mobile device 110 may detect this transition based on the changing acoustic/linguistic characteristics that indicate that the characteristics are within the range of a whispered speech level. In some embodiments, the mobile device 110 may detect this transition based on additional sensor inputs which may indicate that the user 130 is whispering his/her speech. In any case, as soon as the transition is detected, the mobile device 110 identifies that the situation has escalated and thereafter routes communications "I think the shooter is in next room" 520 corresponding to the speech input 170-2 to target devices 120-3 and 120-n included in the whispered speech target device routing list 276.

As an example, assume that the user 130 is a civilian. The civilian user 130 may maintain a whispered speech target device routing list 276 that may include one or more emergency contacts to which any whispered speech identified as being associated with an escalated situation will be routed. For example, the target devices 120-3 and 120-n are identified as emergency contacts (for example, a family contact and/or an emergency call number such as 911) that the user 130 has pre-stored at the whispered speech target device routing list 276. In accordance with some embodiments, to avoid false trigger of an escalated situation, the mobile device 110 also uses natural language understanding algorithms and user context (as acquired from sensor inputs) in combination with detection of whispered speech to determine that the situation has escalated and thereafter routes speech input 170-2 to target devices 120 included in the whispered speech target device routing list 276.

Although the speech inputs 170-1 and 170-2 illustrated in FIG. 4 and FIG. 5 to show non-whispered speech and whispered speech are different in terms of spoken content, it is possible that the same speech input/spoken content (i.e., utterance of same or similar words) may be routed to different set of target devices 120 based on whether the speech input corresponds to a whispered speech or non-whispered speech. For example, assume that the user provides a speech input "I think the person is here" 170. In this case, when the speech input "I think the person is here" 170 does not correspond to a whispered speech, the communications corresponding to the speech input "I think the person is here" 170 is routed to each target device 120 included in the non-whispered speech target device routing list 274. On the other hand, when the speech input "I think the person is here" 170 corresponds to a whispered speech, the communications corresponding to the speech input "I think the person is here" 170 is routed to each target device 120 included in the whispered speech target device routing list 276. In this example, the user is likely whispering "I think the person here" to maintain his/her covert status and/or indicate an escalation of the incident to users of target devices 120 included in the whispered speech target device routing list 276.

In accordance with embodiments of the disclosure, system and method described herein can be advantageously employed to trigger a situation escalation response based on speech inputs. The embodiments described herein automatically monitor speech inputs received at a mobile device and further route such speech inputs to selective target devices based on whether the speech input corresponds to a whispered speech or not. Embodiments described herein automatically modify whispered speech input to ensure that the whispered speech is intelligible for recipients. Embodiments described herein also automatically convert whispered speech input to text data to ensure that any significant data associated with whispered speech is not missed by the recipient during conversation. Embodiments described herein further allow dispatchers and other coordinators to identify locations of persons of interest based on the locations of users whispering speech inputs. Further, the automatic detection of situation escalation based on whispered speech input and corresponding context helps public safety agencies to rapidly disseminate alert and warning notifications to civilians and other public safety personnel at the incident scene.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of routing communications from a mobile device to a target device, the method comprising:
storing, at a memory, a non-whispered speech target device routing list including one or more first target devices and a whispered speech target device routing list including one or more second target devices that are different from the one or more first target devices;
identifying, at an electronic processor, one or more speech characteristics associated with a speech input received at the mobile device during a first call that is established between the mobile device and the one or more first target devices;
determining, at the electronic processor, whether there is a transition in the speech input from a non-whispered speech to a whispered speech based on the one or more speech characteristics;
when it is determined that there is a transition in the speech input from a non-whispered speech to a whispered speech, disconnecting the first call and establishing, at the electronic processor, a second call between the mobile device and the one or more second target devices included in the whispered speech target device routing list and routing, at the electronic processor, communications corresponding to the speech input to the one or more second target devices included in the whispered speech target device routing list during the second call; and when it is determined that there is no transition in the speech input from a non-whispered speech to a whispered speech:
routing, at the electronic processor, communications corresponding to the speech input to the one or more first target devices included in the non-whispered speech target device routing list during the first call, and
refraining, at the electronic processor, from routing communications corresponding to the speech input to the one or more second target devices included in the whispered speech target device routing list.

2. The method of claim 1, wherein determining whether there is a transition in the speech input from a non-whispered speech to a whispered speech, comprises:
determining whether the one or more speech characteristics are within a predetermined range of a whispered speech level; and
determining that there is a transition in the speech input from a non-whispered speech to a whispered speech when the one or more speech characteristics are within the predetermined range of the whispered speech level; and
determining that there is no transition in the speech input from a non-whispered speech to a whispered speech when the one or more speech characteristics are outside the predetermined range of the whispered speech level.

3. The method of claim 2, wherein the one or more speech characteristics are selected from the group consisting of a volume level, energy level, frequency level, and amplitude level associated with the speech input.

4. The method of claim 1, further comprising:
determining, at the electronic processor, one or more contextual parameters associated with the speech input;
selecting, at the electronic processor, one or more other target devices based on the one or more contextual parameters; and
updating the whispered speech target device routing list to include the one or more other target devices.

5. The method of claim 4, further comprising:
defining a geofence based on the one or more contextual parameters; and
selecting the one or more other target devices to be included in the whispered speech target device routing list when the one or more other target devices are located within the geofence.

6. The method of claim 1, wherein when it is determined that the speech input corresponds to a whispered speech, the method further comprising:
adjusting the one or more speech characteristics associated with the speech input to generate a modified speech input such that the one or more adjusted speech characteristics are outside of a predetermined range of a whispered speech level; and
routing communications corresponding to the modified speech input to the one or more second target devices included in the whispered speech target device routing list during the second call.

7. The method of claim 1, wherein the communications include one of audio, text, or multimedia data corresponding to the speech input.

8. A mobile device, comprising:
a memory for storing a non-whispered speech target device routing list including one or more first target devices and a whispered speech target device routing list including one or more second target devices that are different from the one or more first target devices;
a wireless transceiver; and
an electronic processor communicatively coupled to the memory and the wireless transceiver, the electronic processor configured to:
identify one or more speech characteristics associated with a speech input received at the mobile device during a first call that is established between the mobile device and the one or more first target devices;
determine whether there is a transition in the speech from a non-whispered speech to a whispered speech based on the one or more speech characteristics;
when it is determined that there is a transition in the speech input from a non-whispered speech to a whispered speech, establish a second call between the mobile device and the one or more second target devices included in the whispered speech target device routing list, and route, via the wireless transceiver, communications corresponding to the speech input to the one or more second target devices included in the whispered speech target device routing list during the first call; and
when it is determined that there is no transition in the speech input from a non-whispered speech to a whispered speech:
route, via the wireless transceiver, communications corresponding to the speech input to the one or more first target devices included in the non-whispered speech target device routing list during the first call, and refrain from routing communications corresponding to the speech input to the one or more second target devices included in the whispered speech target device routing list.

9. The mobile device of claim 8, wherein the electronic processor is further configured to:
determine whether the one or more speech characteristics are within a predetermined range of a whispered speech level; and
determine that there is a transition in the speech input from a non-whispered speech to a whispered speech when the one or more speech characteristics are within the predetermined range of the whispered speech level; and
determine that there is no transition in the speech input from a non-whispered speech to a whispered speech when the one or more speech characteristics are outside the predetermined range of the whispered speech level.

10. The mobile device of claim 8, wherein the one or more speech characteristics are selected from the group consisting of: volume level, energy level, frequency level, and amplitude level associated with the speech input.

11. The mobile device of claim 8, wherein the electronic processor is further configured to:
determine, at the electronic processor, one or more contextual parameters associated the speech input;
selecting, at the electronic processor, one or more other target devices based on the one or more contextual parameters; and
updating the whispered speech target device routing list to include the one or more other target devices.

12. The mobile device of claim 8, wherein when it is determined that the speech input corresponds to a whispered speech, the electronic processor is further configured to:
adjust the one or more speech characteristics associated with the speech input to generate a modified speech input such that the one or more adjusted speech characteristics are outside of a predetermined range of a whispered speech level; and route communications corresponding to the modified speech input to the one or more second target devices included in the whispered speech target device routing list during the first call.

13. The mobile device of claim 8, wherein the communications include one of audio, text, or multimedia data corresponding to the speech input.

14. A method of routing communications from a mobile device to a target device, the method comprising:

storing, at a memory, a non-whispered speech target device routing list including one or more first target devices and a whispered speech target device routing list including one or more second target devices that are different from the one or more first target devices;

identifying, at an electronic processor, one or more speech characteristics associated with a speech input received at the mobile device during a first call that is established between the mobile device and the one or more first target devices;

determining, at the electronic processor, whether there is a transition in the speech input from a non-whispered speech to a whispered speech based on the one or more speech characteristics; and responsive to determining that there is a transition in the speech input from a non-whispered speech to a whispered speech, performing, at the electronic processor, one of:

disconnect the first call and establishing a second call between the mobile device and one or more second target devices included in the whispered speech target device routing list and routing communications corresponding to a portion of the speech input that is indicative of the whispered speech to the one or more second target devices included in the whispered speech target device routing list during the second call; and adding the one or more second target devices included in the whispered speech target device routing list to the first call and routing communications corresponding to the speech input to both the one or more first target devices and the one or more second target devices during the first call.

15. The method of claim 14, wherein responsive to determining that there is no transition in the speech input from a non-whispered speech to a whispered speech, the method further comprising:

routing, at the electronic processor, communications corresponding to the speech input to the one or more first target devices included in the non-whispered speech target device routing list during the first call, and refraining, at the electronic processor, from routing communications corresponding to the speech input to the one or more second target devices included in the whispered speech target device routing list.

* * * * *